United States Patent
Ram

(10) Patent No.: US 10,333,460 B2
(45) Date of Patent: Jun. 25, 2019

(54) PRESSURE DRIVEN AUTOMATED SOLAR PANEL CLEANING SYSTEM

(71) Applicant: Ido Ram, Beit Hananya (IL)

(72) Inventor: Ido Ram, Beit Hananya (IL)

( * ) Notice: Subject to any disclaimer, the term of this patent is extended or adjusted under 35 U.S.C. 154(b) by 0 days.

(21) Appl. No.: 15/100,743

(22) PCT Filed: Dec. 3, 2014

(86) PCT No.: PCT/IL2014/000061
§ 371 (c)(1),
(2) Date: Jun. 1, 2016

(87) PCT Pub. No.: WO2015/083149
PCT Pub. Date: Jun. 11, 2015

(65) Prior Publication Data
US 2016/0294319 A1 Oct. 6, 2016

Related U.S. Application Data

(60) Provisional application No. 61/911,484, filed on Dec. 4, 2013.

(51) Int. Cl.
| | |
|---|---|
| *H02S 40/10* | (2014.01) |
| *B08B 1/00* | (2006.01) |
| *B08B 1/04* | (2006.01) |
| *B08B 3/02* | (2006.01) |
| *A46B 13/00* | (2006.01) |
| *A46B 13/06* | (2006.01) |
| *F24S 40/20* | (2018.01) |

(52) U.S. Cl.
CPC ............ *H02S 40/10* (2014.12); *A46B 13/001* (2013.01); *A46B 13/06* (2013.01); *B08B 1/008* (2013.01); *B08B 1/04* (2013.01); *B08B 3/024* (2013.01); *F24S 40/20* (2018.05); *Y02E 10/40* (2013.01)

(58) Field of Classification Search
None
See application file for complete search history.

(56) References Cited

U.S. PATENT DOCUMENTS

| | | |
|---|---|---|
| 2012/0090107 A1 | 4/2012 | Jaeger |
| 2013/0206173 A1 | 8/2013 | Zijlstra |

FOREIGN PATENT DOCUMENTS

| | | |
|---|---|---|
| EP | 2048455 A2 | 4/2009 |
| EP | 2258490 A2 | 12/2010 |
| EP | 2258490 A3 * | 1/2013 |

(Continued)

OTHER PUBLICATIONS

English machine translation of 10-2009-0090722.*

(Continued)

*Primary Examiner* — Michael E Barr
*Assistant Examiner* — Jason P Riggleman
(74) *Attorney, Agent, or Firm* — Ted Whitlock

(57) ABSTRACT

An automated solar panel cleaning system includes a pressure driven motor secured to a body. The motor includes cleaning means, guide members, driving means and a torque transfer member which mechanically communicates with the motor, the driving means and the cleaning means. When pressurized fluid flows through the motor inlet, the motor is configured to drive the torque transfer member, which is configured to drive the driving means the cleaning means.

11 Claims, 2 Drawing Sheets

(56) References Cited

FOREIGN PATENT DOCUMENTS

EP      2625995 A1      8/2013
KR      10-2009-0090722    *    8/2009

OTHER PUBLICATIONS

International Search Report dated Mar. 10, 2015, for International Application No. PCT/IL2014/000061 filed Dec. 3, 2014.

* cited by examiner

PRESSURE DRIVEN AUTOMATED SOLAR PANEL CLEANING SYSTEM

FIELD OF THE INVENTION

The current invention relates to solar panels, such as photovoltaic and/or to water heating solar panels. Specifically, it relates to automated cleaning systems for such panels.

BACKGROUND OF THE INVENTION

Cleaning systems of the field are known and disclosed, e.g., in EP2048455. Solar panels are frequently installed on roofs of buildings and other structures and in other public places. Access to these locations frequently demands special climbing/elevation equipment and generally involves working at heights and/or on sloped surfaces. As a result, access to these locations is relatively dangerous, difficult and usually costly.

To effectively transform sunlight into electricity and/or thermal energy, solar panels need to be maintained in clean conditions. As a result, a solar panel system should be cleaned frequently, the frequency of cleaning depending, inter alia, on installation location, surrounding sources of dust/dirt, and climate.

In addition to the frequency of cleaning and the expense of access to the solar panel system, the overall cost and time to clean solar panels is mostly influenced by the overall size of the solar panel system, i.e., area to be cleaned.

As a result, the cost of cleaning a solar panel system may impact the overall economic worthwhileness of a solar panel systems.

Solar panel cleaning is sometimes performed manually, using devices (such as brushes, cranes, elevators, etc.) and treated water which is typically softened and filtered for the cleaning purpose.

Optimally, cleaning of solar panels should be performed when the panels are cool and/or not in sunlight—to avoid thermal shocks to the panels and not to lose solar energy. Furthermore, in the case of PV (Photo Voltaic) solar panels, washing them in the sunlight could pose an electrical shock risk. Cleaning the panels at nighttime, therefore, is a viable option. However, nighttime manual work is both more expensive and dangerous than day time work.

Therefore, there is a need for an automated solar panel cleaning system that can solve the problems identified hereinabove and can be integrated into existing and new solar panel installations in an easily applied and cost-effective fashion.

SUMMARY OF THE INVENTION

In accordance with the subject matter of the present application there is provided an automated solar panel cleaning system comprising a pressure driven motor configured to convert fluid pressure into torque, the motor being secured to a body and having a motor inlet and outlet; the body comprising:
cleaning means configured for removing light obstructing objects off of a solar panel,
guide members configured for carrying the weight of the cleaning system with minimal friction along the solar panel,
driving means configured for advancing the cleaning system along the solar panel; and
a torque transfer member mechanically communicating with the motor, the driving member and the cleaning means; wherein
when pressurized fluid flows through the motor inlet, the motor is configured to drive the torque transfer member (18), which is configured to drive the driving member and the cleaning means.

In accordance with the subject matter of the present application there is further provided a method of cleaning a solar panel via the cleaning system, the method configured for harnessing only fluid pressure for driving the cleaning system, the method comprising the steps of:
a) mounting the cleaning system onto the solar panel,
b) connecting the motor inlet to a pressured feed line and connecting the motor outlet to at least one faucet; and
c) turning on the at least one faucet.

Any of the following features, either alone or in combination, may be applicable to any of the above aspects of the subject matter of the application:

The cleaning system does not run on, or consume energy from, any source other than the pressurized fluid.

The cleaning means can be at least a brush.

The fluid can be water.

The driving means and the guide means can be a single element, a rubberized wheel.

The driving means and the guide means can be a driving gear and a guide gear respectively.

The cleaning system, and specifically the motor inlet, can be connected to a water feed line and the motor outlet can be connected to at least one faucet; and wherein only when the at least one faucet is turned on, the motor operates.

The cleaning system can further include a water sprinkler which includes at least one nozzle.

The fluid sprinkler can be fed from a source, external to the cleaning system.

The body includes two frame plates which can be connected via rigid frame rods, and the motor can be rigidly connected to the frame rods and one of the frame plates.

The amount of fluid that enters the motor inlet is the same amount as the amount of fluid that leaves it.

The cleaning system can be semi-sealed, and wherein a minute portion of the fluid is sprinkled on the solar panel.

The solar panel has top and bottom edges, each of which can have a rail rigidly attached thereto, and the body is mounted on the rails via the guide means.

The solar panel cleaning system according to claim 1, wherein the guide means and the driving means are a single member.

BRIEF DESCRIPTION OF THE DRAWINGS

For a better understanding of the subject matter of the present application and to show how the same may be carried out in practice, reference will now be made to the accompanying drawings, in which.

Figure 1:
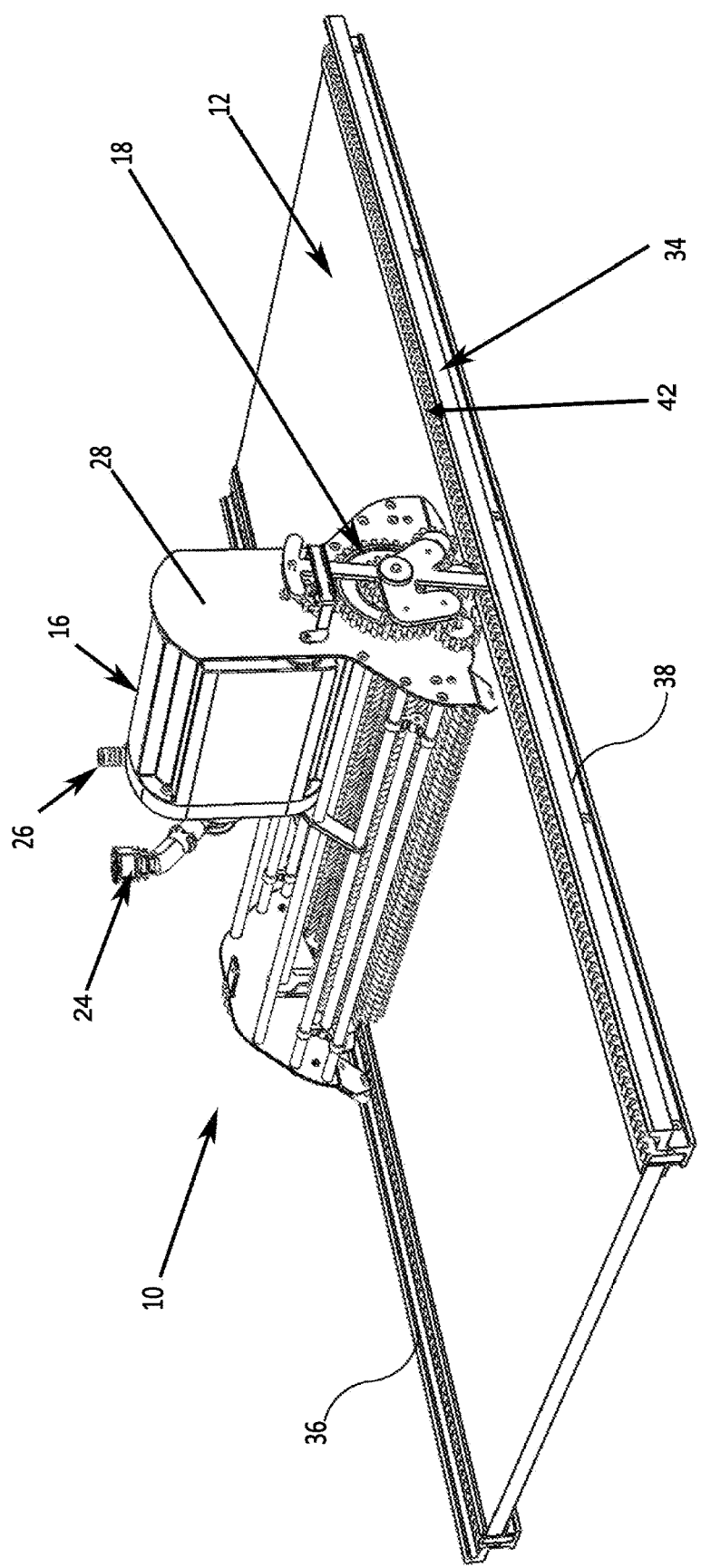
FIG. 1 is an isometric view of a solar panel cleaning system mounted onto a solar panel.
Figure 2:
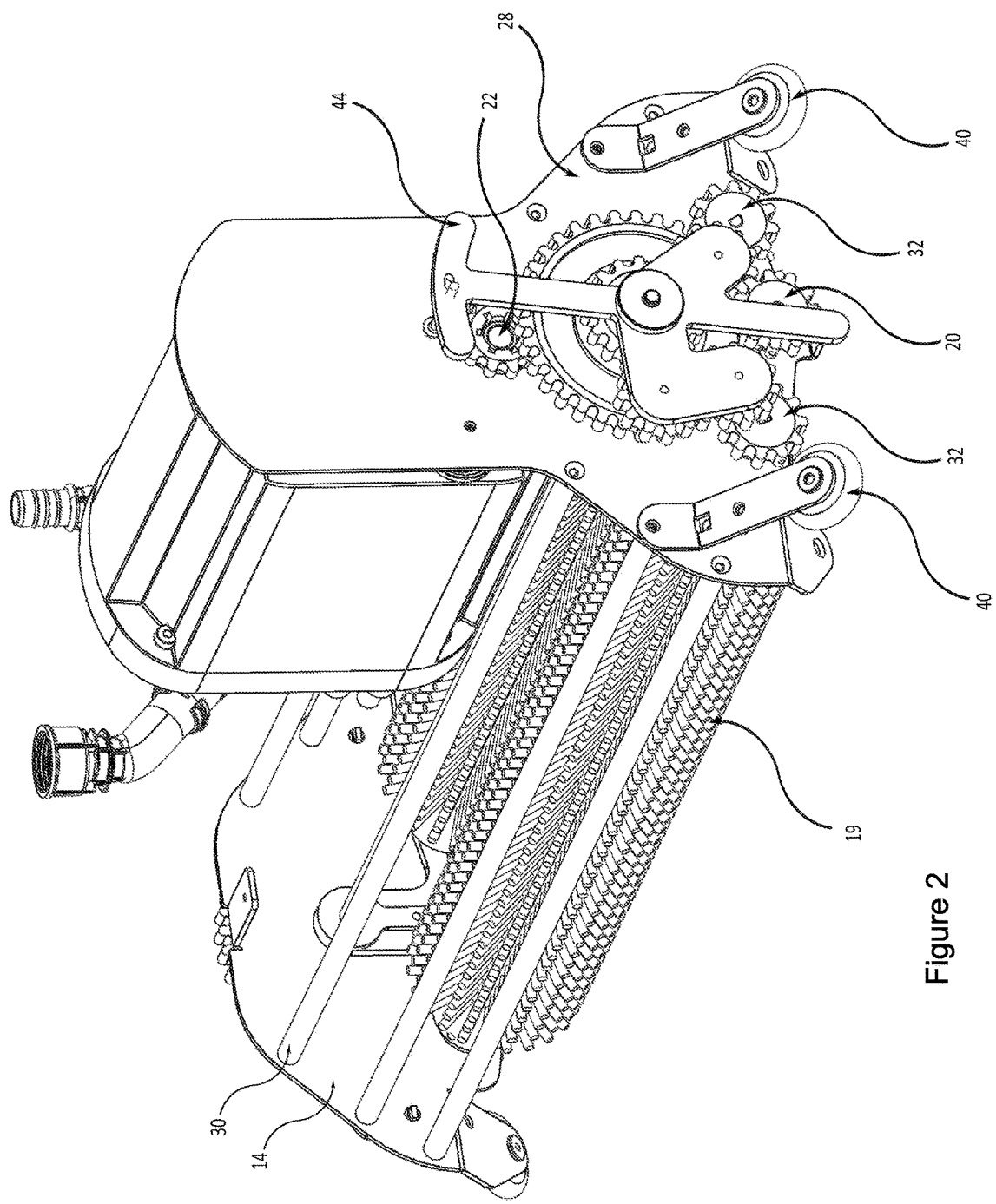
FIG. 2 is an isometric view of the solar panel cleaning system of FIG. 1.

Where considered appropriate, reference numerals may be repeated among the figures to indicate corresponding or analogous elements.

DETAILED DESCRIPTION OF THE INVENTION

In the following description, various aspects of the subject matter of the present application will be described. For purposes of explanation, specific configurations and details are set forth in sufficient detail to provide a thorough understanding of the subject matter of the present application. However, it will also be apparent to one skilled in the art that the subject matter of the present application can be practiced without the specific configurations and details presented herein.

Reference is made to FIG. 1, showing an automated solar panel cleaning system 10 which is mounted on top of an external surface of a solar panel 12. The cleaning system 10 can be detachable, such that it can be easy to move to another solar panel 12. According to the subject matter of present application, the solar panel cleaning system 10 includes a body 14, a pressure driven motor 16 for converting pressure into torque, a torque transfer member 18 such as a gear assembly 18, cleaning means 19 such as a brush 19, and driving means 20 such as a simple toothed gear.

It is noted that in the current disclosure the word connect, or connecting, when used with regards to fluid, it should be understood that one component is "in fluid communication" with another component.

According to a preferred embodiment, the motor 16 is connected to a fluid feeding line, such that the same amount of fluid that enters the motor 16—exits it. In other words, no fluid is consumed, or wasted, by the motor 16. The motor 16 only causes a drop in pressure when comparing fluid pressure which left the motor 16 to fluid pressure entering it. According to the present embodiment, the fluid is water.

The motor 16 can be a standard, shelf-product, water driven motor 16. The motor 16 outputs the torque to other members via a motor gear 22. According to the present embodiment, the motor 16 delivers torque to the driving means 20 and the cleaning means 19 via a torque transfer member 18. In the present embodiment the torque transfer member 18 is an assembly of gears which receives the rotational speed of the motor gear 22 and turns other gears at modified speeds according user requirements. The motor 16 includes fluid motor inlet and outlet 24, 26. In the present embodiment pressured water flows into the motor inlet 24 and drives the motor 16. The motor 16 converts the pressure into torque which rotates, or drives, the motor gear 22. According to some embodiments, the motor 16 can include direction changing means, and its own gear system. In other words, according to these embodiments, the motor gear 22 rotates at required speeds, and not necessarily according to pressure.

According to the present embodiment, the body 14 can include two parallel frame plates 28 interconnected via at least two frame rods 30. The brush 19, or brushes, can be mounted on the frame rods 30, and have brush gears 32 rigidly mounted at each end thereof. The brush gears 32 can be connected to, or can be a part of, the gear assembly 18. The motor 16 can be rigidly secured to at least a frame rod 30 and at least one of the frame plates 28. Alternatively, if not connected to a frame plate 28, secured to at least two frame rods 30.

The cleaning assembly is mounted on guide rails 34 which are rigidly secured to top and bottom edges 36, 38 of the solar panel 12, preferably along the entire length thereof. The body 14 can have four guide means 40, or according to the present embodiment, guide wheels 40. Two guide wheels 40 are located on each side of the body 14 (or, mounted to a bottom portion of each frame plate 28), which correspond to, and roll on, the guide rails 34. When supported just by the guide wheels 40, the cleaning system 10 can freely move back and forth along one directions on the guide rails 34 with little friction. Further mounted on the solar panel 12, parallel to (or on the edge of) the guide rails 34, and preferably at least equal in length, is at least one traction rail 42. The traction rail 42 can be serrated along its entire length, and configured to engage, or correspond with the driving means 20. According to the present embodiment, the driving means are a gear, the teeth of which, correspond to the serration on the traction gear 20. Due to the fact that the traction rail is rigidly secured to the solar panel 12, when the driving wheel 20 is turned, the cleaning system 10 is moved along the guide rails 34.

It is noted that the frame plates 28, rods can be assembled in different positions, with different angles between the flame plates 28, and with various frame rod 30 lengths, allowing for a custom adaptation of the cleaning system 10 to a wide range of angular positions and solar panels of different sizes.

According to the present embodiment, the torque transfer member 18 is a gear assembly 18 which is mounted on the outward facing sides of each of the frame plates 28. The gear assembly 18 can include several interconnected gears, some of which are the brush gears 32, connected to ends of frame rods 30, and others are the driving means. The gear assembly 18 can include mechanical direction-changing means 44 (in the present embodiment—a lever 44, on which some of the gears are mounted for transferring torque in each direction) for switching the gear rotation direction, and thus changing the movement direction of the cleaning assembly.

According to another embodiment, the cleaning system 10 include sensors, configured to determine the location of the cleaning system 10 along the solar panel 12. In scenarios in which the cleaning, system 10 stopped in a location blocking the light for the solar panel 12, the cleaning system 10 can be configured to turn on a small faucet, releasing a very small amount of water, to enable moving the cleaning system 10 out of the way, such that it would not obstruct the sun.

A significant advantage of the cleaning system 10 is that it can run, and usually does run, after sunset (mostly, people shower, or wash dishes in the evenings), during which, the conditions for solar panel 12 cleaning are optimum (see background).

Another significant advantage of the cleaning system 10, is that contrary to solar cleaning systems, the current system 10 is not dependent on light, or on batteries, or electricity supply (e.g. batteries).

Another advantage of the current invention is that it only runs when water is used. According to one example, the cleaning system 10 is connected to a main water line of a household. According to this example, whenever a faucet is turned on, water is used e.g. for a shower, and the cleaning system 10 operates as long as the water is running. In this way, since the only consumption is a drop in water pressure, no other power source is needed.

It is noted that the pressure drop can be relatively small, or even regarded as negligent, in comparison to the pressure measured before entering the motor 16, such that it preferably has a small effect on the faucet user.

A significant consideration for cleaning solar panels using automated solar panel cleaning system 10, is that of water consumption, whether the water is supplied directly, recycled, and/or treated.

Wired or wireless control systems may be added to solar panel cleaning system 10, such as, but not limited to: control means (e.g. electric faucets) to turn on or off a faucet at specified times and for specified time intervals; and directly or indirectly measure soiling of the solar panels and thereby provide control and feedback to a system to activate the automated cleaning system as necessary (activating the system 10 is referred to turning on a faucet that can be regarded as an access faucet, located before the motor inlet 24, only for allowing water to flow through the motor 16). It is noted that the system 10 can be operated manually as well as automatically, or electronically. In other words, an operator can turn on a faucet, or a manual valve, in order to start the cleaning system's operation, or he/she can use a remote or timer which controls an electric valve.

According to the subject matter of the present application, the cleaning system 10 simply lies on top of the solar panel 12. The cleaning system 10 can therefore be easily moved, or transferred, from one solar panel 12, or panels, to another. This arrangement negates complicated, or otherwise expensive or time consuming, installation process. An operator of the system 10 can simply lift the system 10 from one solar panel 12 and set it on another solar panel 12. In some embodiments, the cleaning system 10 can include rail locking arms to prevent the cleaning system 10 from falling from its rails.

According an embodiment, the system 10 can include driving rubberized wheels, which drive the cleaning system 10 and negate traction rails. In other words, the rubberized wheels can both hold the weight of the cleaning system and drive it along the guide rails 34, thus combining the driving means 20 and the guide means 40 into a single member.

According to some embodiments, the cleaning system has a valve bypass system, which enables the user to bypass the cleaning system 10 (diverting water such that it doesn't flow through the cleaning system 10) and return the original setup prior to the installation of the cleaning system 10.

The invention claimed is:

1. A solar panel cleaning system (10) comprising a pressure driven motor (16), said cleaning system (10) connected to a water feeding line, wherein said driven motor (16) is configured to convert a pressure drop of water into torque when said water is flowing through said feeding line, the motor (16) being secured to a body (14) and having a motor inlet (24) connected to a motor feed line and a motor outlet (26) connected to at least one faucet;
    the body (14) comprising:
        cleaning means (19) configured for removing light obstructing objects off of a solar panel (12);
        at least one guide means (40) configured for carrying the weight of the cleaning system (10) with minimal friction along the solar panel (12);
        at least one driving means (20) configured for advancing the cleaning system (10) along the solar panel (12); and
        a torque transfer member (18) mechanically communicating with the motor (16), the driving means (20) and the cleaning means (19);
    wherein, when said at least one faucet is turned on, pressurized water flows through the motor inlet (24), the motor (16) is configured to drive the torque transfer member (18), which is configured to drive the driving means (20) and the cleaning means (19) and wherein the amount of water that enters the motor inlet (24) is the same amount as the amount of warier that leaves it.

2. The solar panel cleaning system (10) according to claim 1, wherein the cleaning system (10) does not run on, or consume energy from, any source other than from water when flowing through said water feeding line.

3. The solar panel cleaning system (10) according to claim 1, wherein the cleaning means (19) are at least a brush.

4. The solar panel cleaning system (10) according to claim 1, wherein said at least one driving mean (20) and said at least one guide mean (40) are combined into one single element, a rubberized wheel.

5. The solar panel cleaning system (10) according to claim 1, wherein the driving means (20) and the guide means (40) are a driving gear (20) and a guide wheel (40) respectively.

6. The solar panel cleaning system (10) according to claim 1, wherein the cleaning system (10) further comprises a water sprinkler which comprises at least one nozzle.

7. The solar panel cleaning system (10) according to claim 6, wherein the water sprinkler is fed from a source, external to the cleaning system (10).

8. The solar panel cleaning system (10) according to claim 1, wherein the body (14) comprises two frame plates (28) which are connected via rigid frame rods (30), and the motor (16) is rigidly connected to the frame rods (30) and one of the frame plates (28).

9. The solar panel cleaning system (10) according to claim 1, wherein said at least one guide mean (40) and said at least one driving mean (20) are combined into a single member.

10. A method of cleaning a solar panel (12) via the cleaning system (10) according to claim 1, the method comprising driving said cleaning system (10) by harnessing only said pressure drop of water in a feeding line when water is flowing through said water feeding line, the method comprising the steps of:
    a) mounting the cleaning system (10) onto the solar panel (12);
    b) connecting the motor inlet (24) to a pressured feed line and connecting the motor outlet (26) to at least one faucet; and
    c) turning on the at least one faucet.

11. The method of claim 10, wherein said mounting the cleaning system (10) onto said solar panel (12) comprising mourning said body (14) via said guide means (40) on rails situated on a top edge of said solar panel (36) and a bottom edge of the solar panel (38).

* * * * *